UNITED STATES PATENT OFFICE.

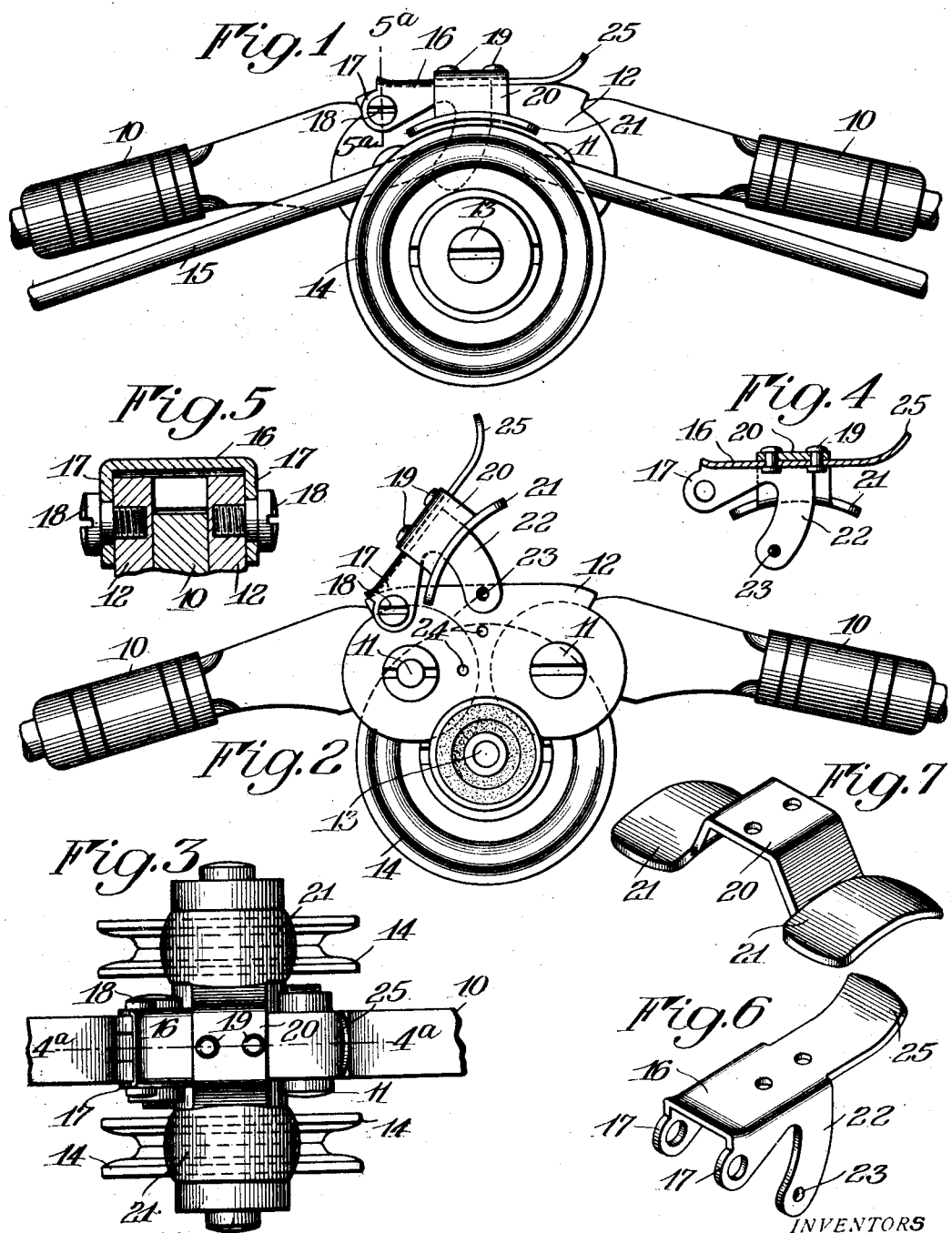

OSCAR H. PIEPER AND ALPHONSE F. PIEPER, OF ROCHESTER, NEW YORK.

PULLEY-GUARD.

1,348,240.  Specification of Letters Patent.  Patented Aug. 3, 1920.

Application filed May 21, 1919. Serial No. 298,754.

*To all whom it may concern:*

Be it known that we, OSCAR H. PIEPER and ALPHONSE F. PIEPER, both of Rochester, in the county of Monroe and State of New York, have invented certain new and useful Improvements in Pulley-Guards; and we do declare the following to be a full, clear, and exact description of the same, reference being had to the accompanying drawings, forming a part of this specification, and to the reference-numerals marked thereon.

This invention relates to pulley guards for retaining the belt or cable on the pulley, and, while capable of various applications, is particularly useful in conjunction with the pulleys of the extensible, jointed brackets commonly employed with dental engines to support the dental tool and the belt for driving it. It is desirable in the operation of such apparatus to have means for retaining the belt in place on the pulley which also permits of its ready removal when necessary, one object of the invention being the provision of a pulley guard of this character which is simple and inexpensive in construction and convenient in operation.

Another object is to provide an adjustable guard of this nature which may be conveniently adjusted to operative position close to the pulley to retain the belt thereon, or to one or more inoperative positions, to permit the removal of the belt. To these and other ends the invention consists in certain improvements and combinations of parts all as will be hereinafter more fully described, the novel features being pointed out in the claims at the end of the specification.

In the drawings:

Figure 1 is a side elevation of a portion of a dental engine bracket showing the invention applied thereto and in operative relation.

Fig. 2 is a similar view with parts removed, showing the invention in inoperative relation.

Fig. 3 is a top plan view.

Fig. 4 is a vertical section on the line 4ª—4ª of Fig. 3.

Fig. 5 is a section on the line 5ª—5ª of Fig. 1.

Figs. 6 and 7 are perspective views of portions of the guard disassembled.

Similar reference numerals throughout the several views indicate the same parts.

The invention, in the embodiment at present preferred, is illustrated in its application to a dental engine bracket having the usual supporting arms 10, pivotally connected at 11 to an intermediate connecting member 12, on the opposite sides of which at 13 are journaled the pulleys 14. The latter, in the present instance, are shown as of the grooved type, carrying belts or cables 15 connected with the motor and driving the dental tool.

The pulley guard comprises, preferably, a substantial saddle, or U-shaped part 16, movably carried by the member 12, having, preferably, depending arms 17 embracing the member 12 and pivotally connected thereto by means of screws 18, so that the guard may be swung toward and from the pulleys about a pivotal axis parallel with the axis of the pulley. Fixed to the part 16, as by means of rivets 19, is a part 20, Fig. 7, having extending therefrom on either side belt engaging or retaining portions 21, adapted to lie close to the peripheries of the pulleys, when the guard is in operative position, to prevent disengagement of the belt therefrom.

Part 16 of the guard has also depending arms 22 preferably resilient in construction, which embrace member 12 in frictional engagement with its opposite sides. Arms 22 preferably, have formed in their lower ends inwardly projecting beads 23, adapted to engage with recesses 24 in the sides of member 12, serving as detents for yieldably holding the guard in various positions of adjustment with reference to the proximity of the belt retaining portions 21 to the pulley. The lowermost recess 24 corresponds to the operative position of the guard in which it retains the belt on the pulley while the upper recesses 24 hold the guard in inoperative position at different distances from the pulley, as may be found convenient for the purpose of removing the belt. The guard is formed with a fingerpiece 25 by means of which it may be conveniently adjusted to its various positions.

The operation of the device is evident from the construction disclosed. When it is desired to engage a belt with the pulleys, or to remove it therefrom, the guard is adjusted, by means of the fingerpiece 25, to one of its upper positions and when the belt is in place on the pulley, the guard is then moved to its lowermost position in which it is retained by the frictional engagement of the arms 22 with the sides of member 12.

The construction is simple in character, comprising but a few parts and is therefore inexpensive to manufacture, and the form and arrangement of the parts afford a very convenient means for accomplishing the desired results.

We claim as our invention:

1. The combination with a support and a rotatable pulley thereon, of an adjustable pulley guard pivotally carried by said support for a swinging movement into and out of proximity with said pulley, a belt retaining portion on said guard and parts on said guard embracing said support in frictional engagement therewith to retain said guard as adjusted in operative or inoperative relation to said pulley.

2. The combination with a support and a rotatable pulley thereon, of an adjustable pulley guard having parts embracing and pivotally connected with said support, a belt retaining portion on said guard, and retaining means on said guard in frictional engagement with said support for retaining said guard as adjusted in operative or inoperative relation to said pulley.

3. The combination with a support and a pulley rotatably carried thereby, of a guard for said pulley comprising an adjustable yoke, a belt retaining portion on said yoke, parts on said yoke embracing said support and pivotally connected therewith, and other parts on said yoke embracing said support in frictional engagement therewith to retain said yoke as adjusted in operative or inoperative relation to the pulley.

4. The combination with a support and a rotatable pulley thereon, of a pulley guard adjustably carried by said support, a belt retaining portion on said guard, and a resilient part on said guard frictionally engaging said support, said part and support being formed to provide a plurality of detents for retaining said guard in varying proximity with relation to said pulley.

5. The combination with a support and a rotatable pulley thereon, of a substantially U-shaped pulley guard embracing and pivotally carried by said support, a belt retaining portion on said guard movable toward and from the belt by the pivotal movement of the guard, resilient arms on said guard also embracing said support, and coöperating parts on said support and arms forming a plurality of detents for retaining the guard in different positions of adjustment.

6. In a dental engine bracket, the combination with a supporting member thereof having a pulley journaled thereon, of a pulley guard comprising a part having angularly extending portions thereon arranged to embrace said member and adjustably carried thereby, a belt engaging portion for retaining the belt on the pulley, and portions formed to frictionally engage said member and maintain the said belt engaging portion of said guard in a plurality of adjusted positions with relation to said pulley.

7. The combination with a support and pulleys journaled on opposite sides thereof, of a guard movably carried by said support and having belt engaging portions thereon coöperating with said pulleys, and retaining means on said guard embracing said support in frictional engagement with opposite sides thereof for retaining said guard in different positions of proximity with relation to said pulley.

8. In a dental engine bracket, the combination with a supporting member thereof having pulleys journaled on opposite sides thereof, of a pulley guard adjustably carried by said member and comprising belt engaging portions for retaining the belts on said pulleys, and retaining means on said guard embracing said member in frictional engagement therewith for retaining said belt engaging portions in different positions of proximity with relation to said pulleys.

OSCAR H. PIEPER.
ALPHONSE F. PIEPER.